M. HEFFERNAN.
ATTACHMENT FOR DISCHARGING CONTENTS FROM VESSELS.
APPLICATION FILED MAY 14, 1920.
1,380,062.
Patented May 31, 1921.
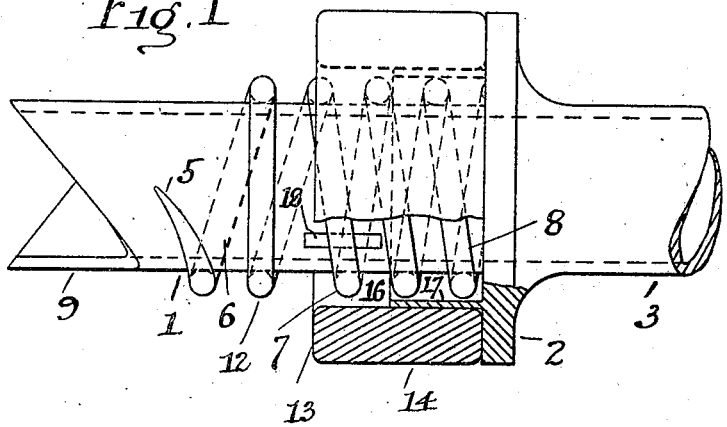
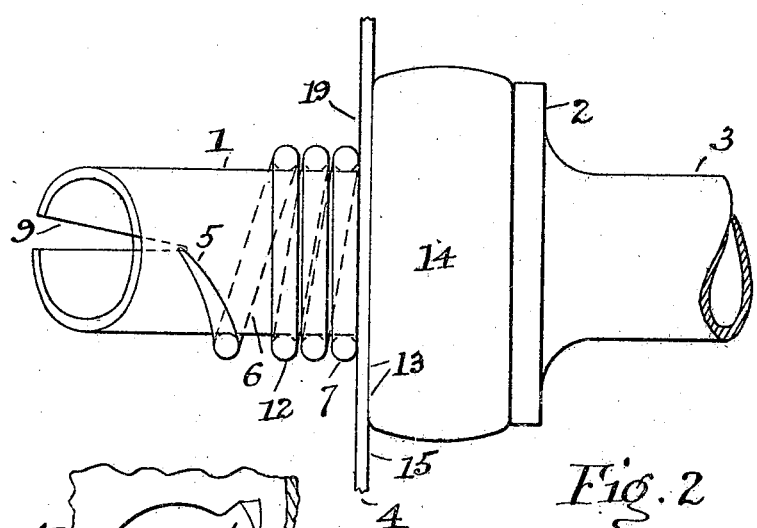
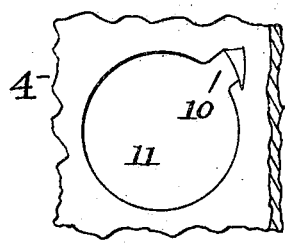
INVENTOR:
Michael Heffernan
BY Wm Wallace White
ATTY.

UNITED STATES PATENT OFFICE.

MICHAEL HEFFERNAN, OF CARRAP, EDENHOPE, VICTORIA, AUSTRALIA, ASSIGNOR OF ONE-THIRD TO JAMES CHRISTIAN GLANCY, OF APSLEY, VICTORIA, AUSTRALIA.

ATTACHMENT FOR DISCHARGING CONTENTS FROM VESSELS.

1,380,062.  Specification of Letters Patent.  Patented May 31, 1921.

Application filed May 14, 1920. Serial No. 381,501.

*To all whom it may concern:*

Be it known that I, MICHAEL HEFFERNAN, a subject of the King of Great Britain and Ireland, etc., residing at Carrap, Edenhope, in the State of Victoria, Commonwealth of Australia, have invented certain new and useful Improvements in Attachments for Discharging Contents from Vessels; and I do hereby declare the following to be a full, clear, and exact description of the invention, such as will enable others skilled in the art to which it appertains to make and use the same.

This invention relates to removable attachments to various articles including walls of vessels, especially of sheet metal containers of fluid such as petrol or kerosene. The attachments include tubes for emptying, or for introducing liquid into the vessels; or the attachments provide, and when required cut off, air passages. Or they are used for any other purpose. These attachments are quickly connected or removed.

Each attachment has a stem, a cutter to puncture the vessel so as to admit part of the stem, and means including a spring coil for clamping the stem tightly to the vessel. Other inventions of the same type have a spring coil, but it is differently used, and has not produced such tight gripping as the present construction. Where the stem is tubular it is very important that the attachment be more leak proof than prior constructions using a coil have been, and this result is secured.

In the drawings herewith an attachment made according to this invention is illustrated, but the invention is not limited to the designs or proportions or to minor features of the parts shown, consequently the construction may have obvious additions, and modifications, so long as matter hereinafter claimed is retained.

Figure 1 is a side view of the attachment having an outer abutment ring part of which is broken away to exhibit the interior.

Fig. 2 is a side view of an attachment firmly clamped to a wall which may be that of a petrol can. The cutter is of different form from that of Fig. 1.

Fig. 3 shows part of a sheet metal wall, with a hole as made in it by the cutters of this device.

This attachment may be set in horizontal, vertical, or other appropriate position, and though it will usually make its own hole in the vessel, it could utilize a hole made otherwise.

In the example illustrated a tube is provided for pouring purposes. 1 is its inner end; it is of any suitable length and has a flange or collar 2, dividing its inner end 1 from its outer end 3. In the preferred construction the collar is integral with the stem, but it may be separate and adjustable, as by being screwed on to a screw-threaded part (not shown) of the stem. The outer portion of the stem will be varied according to the intended application of the attachment; and thus it may carry a spout, tap, funnel, screwthread, eye, hook, bearing, chain, or handle, no particular detail being claimed.

When the inner end 1, is fixed inside a wall 4, which may be part of a petrol tin, a coil point 5 and the fore part 6 of the coil and part of the middle 7 of the coil will also be inside. The rear 8 of the coil will be outside in cases explained hereinafter. To enable insertion of the stem, its end 1 is provided with cutting members, various suitable forms of cutter being well known, as in Figs. 1 or 2, in which 9 are cutting edges, which act when the stem is rotated and pressed against wall 4. Another cutter 5 forms the front end of the coil, which is of wire or like suitable material and is of square, circular, or other cross section.

The coil incloses part of the stem, and its cutter 5, and a short part 12 of the coil behind it, are fixed to the stem as by brazing. Point 5 pierces the wall or vessel when pressed into it, enlarging as at 10 the hole 11, which will have been made by cutting members 9, but the edges of the hole 11, 10, will be more or less jagged, and they will not be in one plane.

Part 12 of the coil is fixed to the stem because it has to act as a strong abutment; this part is in some cases located at, or nearly at, right angles to the longitudinal axis of the stem or tube, and the result is that some of the coil at the rear of part 12 can be pressed against the fixed part in planes parallel to the latter as in Fig. 2. This is important because the coil will then press firmly all around against the inner side of the wall 4 for the purpose indicated hereinafter.

When the stem by pressure and rotation has been inserted so that a gapped hole, 10, 11 has been made in the article or wall 4 further rotation advances the stem and coil end into the vessel until the face 13 of a ring 14 on the attachment meets the outer face 15 of the wall.

When it is desired that the ring shall act as a leak preventer, it is preferably formed of resilient material, such as rubber, and in such cases it is backed by the flange or collar 2. This ring is preferably of such internal diameter that its face 13 contacts with the outer surface of the vessel at some distance from the edges of the opening 11, which will often be ragged and uneven and would therefore tend to damage a resilient ring if the latter was in contact therewith under pressure, as it would have to be to form a clamping, leak-preventing means.

At the distance from the hole where the ring contacts with the wall the latter is smooth and able to withstand greater pressure, without injury to the resilient ring when the latter is rotated or is left under pressure. If leak prevention is not necessary, the utilization of the aforesaid smooth annular surface remote from hole 11 is still advantageous to promote powerful clamping.

The ring 14 houses and protects part of the coil in a space 16 around the stem, but allows a housed part of the coil to move outward when required. The said housed part is as explained later moved outward as in Fig. 2 for clamping purposes. The rear end of the coil may extend to or near flange 2. To prevent chafing or undue pressure by the coil on the ring interior there is provided around the coil rear in some cases a protective ferrule 17.

If desired the ring 14 will be set more forward, as by placing a washer between it and flange 2. To allow of pouring fluid from the vessel when it is nearly empty (the vessel being tilted if necessary) the stem is slotted or apertured as at 18 under ring 14 and across wall 4.

When effecting the clamping, ring 14 meets the surface 15 as described, part of the coil being on side 19 of the wall; then the stem is rotated with pressure and more of the coil becomes forced to side 19, the coil rear drawing away from collar 2. The greater the rotation the more of the coil (which is springy) which was in space 16 passes to side 19 and becomes compressed between the fixed part 12 and the wall inner surface as in Fig. 2.

In this way the abutment ring or stop 14 also becomes firmly compressed between wall surface 15 and stem flange 2; and the clamping is complete.

Easy removal of the attachment is facilitated by having a coil of such length that it cannot all be forced to side 19 but must in part remain in space 16, outside the wall.

The described device is usable to provide an air hole in a vessel or wall, its rotatable stem being added to at will by means of obvious kind to cut off passage of air if required.

Any suitable abutment which incloses the stem my be substituted for ring 14.

Having described this invention, what is claimed by Letters Patent is:—

1. A self-clamping device of the character described, comprising a stem adapted to puncture a wall, a flexible member having its forward end pointed and secured to the stem for passage through the wall thereby to carry said flexible member into position to exert spring tension on one side of said wall, and means carried by the stem for clamping said wall between it and said flexible member.

2. A self-clamping device of the character described, comprising a stem adapted to puncture a wall, a spring coil encircling said stem and secured thereto at its forward portion, the rear portion of said coil being free to move longitudinally of said stem, and means carried by said stem for clamping said wall between it and the longitudinally movable portion of the coil.

3. A self-clamping device of the character described, comprising a stem adapted to puncture a wall, a spring coil encircling said stem and secured thereto at its forward portion approximately at right angles to the longitudinal axis of the stem, the rear portion of said coil being free to move longitudinally of said stem, means carried by said stem for clamping said wall between said means and the longitudinally movable portion of the coil, and a resilient ring between said means and the outer side of said wall.

4. A stem to be clamped, having cutting means at one end, a resilient ring inclosing a space around the stem, a collar or enlargement backing the ring, a coiled spring around the stem, the coil fore end being permanently fixed to the stem, the rest of the coil being partly housed within the ring, and a ferrule between the ring and the coil rear.

5. A hollow stem to be clamped, having a cutting end and a collar or flange, a coiled spring having a fixed fore end, a ferrule around the spring rear, and a resilient ring around the ferrule and part of the coil, the stem being slotted under the ring to allow of drainage of a nearly empty vessel.

6. A self-clamping device of the character described, comprising a stem adapted to puncture a wall, a spring coil encircling said stem and secured thereto at its forward portion, the rear portion of said coil being free to move longitudinally of said stem, a resilient ring encircling the free portion of said coil, and a flange carried by the stem and adapted to clamp said wall between said ring and the longitudinally movable portion of the coil.

In witness whereof I have hereunto set my hand.

MICHAEL HEFFERNAN.